United States Patent
Schmidt

(10) Patent No.: US 6,554,744 B2
(45) Date of Patent: Apr. 29, 2003

(54) APPARATUS AND METHOD OF CONTROLLING THE ROAD SPEED OF A MOTOR VEHICLE

(75) Inventor: Werner Schmidt, Rengsdorf (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/944,560

(22) Filed: Aug. 31, 2001

(65) Prior Publication Data

US 2002/0029914 A1 Mar. 14, 2002

Related U.S. Application Data

(63) Continuation of application No. PCT/EP00/01588, filed on Feb. 25, 2000.

(30) Foreign Application Priority Data

Mar. 3, 1999 (DE) .......................................... 199 09 326

(51) Int. Cl.$^7$ ............................................... B60K 41/20
(52) U.S. Cl. ...................... 477/208; 477/200; 477/187
(58) Field of Search .................................. 477/199, 200, 477/201, 202, 184, 187, 208

(56) References Cited

U.S. PATENT DOCUMENTS

| | | | |
|---|---|---|---|
| 2,626,026 A | * | 1/1953 | Sherwood et al. .......... 188/152 |
| 2,871,999 A | * | 2/1959 | Hemphill ................ 188/106 R |
| 2,877,880 A | * | 3/1959 | Peebles et al. .............. 477/201 |
| 2,881,879 A | * | 4/1959 | Perrino ........................ 137/47 |
| 3,127,966 A | * | 4/1964 | Sheriff et al. ................ 188/152 |
| 3,891,071 A | * | 6/1975 | Tuzson ........................ 188/270 |
| 4,146,108 A | | 3/1979 | Sato |
| 4,717,207 A | | 1/1988 | Kubota et al. |
| 6,056,373 A | | 5/2000 | Zechmann et al. |
| 6,270,171 B1 | * | 8/2001 | Krieg et al. .............. 303/113.3 |
| 6,296,326 B1 | * | 10/2001 | Steiner et al. ............... 303/125 |
| 6,296,327 B1 | * | 10/2001 | Linkenbach ................. 303/125 |

FOREIGN PATENT DOCUMENTS

| | | |
|---|---|---|
| DE | 24 20 252 | 10/1975 |
| DE | 36 18 532 | 12/1986 |
| DE | 196 25 919 | 1/1998 |
| WO | WO-98/05538 A2 * | 2/1998 |

* cited by examiner

Primary Examiner—Ankur Parekh
(74) Attorney, Agent, or Firm—MacMillan, Sobanski & Todd, LLC

(57) ABSTRACT

An apparatus (10) for controlling the road speed of a motor vehicle has an accelerator pedal (12), which is biased counter to its actuating direction into an inoperative position and is movable from the inoperative position into a neutral position, from which a further movement of the accelerator pedal (12) counter to the spring bias leads to an increase of the drive torque of the motor vehicle drive. A device for detecting the inoperative position of the accelerator pedal (12) is connected to a braking-force generator (40) and in the inoperative position of the accelerator pedal (12) causes the braking-force generator (40) to make a predetermined braking force available. In order to make the apparatus (10) more comfortable, according to an alternative the braking-force generator (40) builds up the predetermined braking force in a controlled manner when the accelerator pedal (12) attains its inoperative position, and/or reduces the built-up braking force in a controlled manner when the accelerator pedal (12) leaves its inoperative position. According to another alternative, the device for detecting the inoperative position of the accelerator pedal (12), upon a movement of the accelerator pedal (12) from the inoperative position into the neutral position, causes the braking-force generator (40) to reduce the predetermined braking force in accordance with the accelerator pedal movement and vice versa.

15 Claims, 3 Drawing Sheets

APPARATUS AND METHOD OF CONTROLLING THE ROAD SPEED OF A MOTOR VEHICLE

CROSS REFERENCE TO RELATED APPLICATIONS

This application is a continuation of International Application No. PCT/EP00/01588 filed Feb. 25, 2000, which claims priority to German Patent Application No. 19909326.1 filed Mar. 3, 1999.

BACKGROUND OF THE INVENTION

The invention relates to an apparatus and a method of controlling the road speed of a motor vehicle.

In modern motor vehicles the road speed is usually controlled by means of a pedal, also known as an accelerator pedal, which is biased counter to its actuating direction into an inoperative position and through the actuation of which the drive torque and/or the drive power of the motor vehicle engine may be increased. When the driver of the motor vehicle wishes to lower the road speed, he reduces the actuating force exerted on the accelerator pedal in order to move the accelerator pedal back towards, or fully into, its inoperative position. If this is not sufficient to achieve the desired lowering of the road speed, the driver actuates a brake pedal, which is usually likewise provided in the motor vehicle.

From DE-A-24 20 252 an accelerator pedal arrangement for motor vehicles is known, which in the unloaded state of the accelerator pedal activates a parking brake. Upon actuation of the accelerator pedal the parking brake is released.

SUMMARY OF THE INVENTION

The object of the invention is to indicate an apparatus and a method, which simplify control of the road speed of a motor vehicle.

Proceeding from the initially described apparatus comprising a braking-force generator for controlling the road speed of a motor vehicle, said object is achieved according to the invention in that the braking-force generator builds up the predetermined braking force in a controlled manner when the accelerator pedal reaches its inoperative position and/or reduces the built-up braking force in a controlled manner when the accelerator pedal leaves its inoperative position. The predetermined braking force is therefore not made available abruptly but brought up e.g. according to a preselected ramp function. In an analogous manner, the built-up braking force is preferably reduced in a controlled manner when the accelerator pedal leaves its inoperative position.

According to an alternative of the apparatus according to the invention the device for detecting the inoperative position of the accelerator pedal, upon a movement of the accelerator pedal from the inoperative position into the neutral position, causes the braking-force generator to reduce the predetermined braking force in accordance with the accelerator pedal movement and vice versa. In said manner, a driver may himself purposefully proportion the braking function of the apparatus according to the invention within the preselected limits, i.e. up to the predetermined braking force, by moving the accelerator pedal to a greater or lesser extent and/or more or less quickly between the inoperative position and the neutral position. Given such a form of construction, the device for detecting the inoperative position of the accelerator pedal takes the form of a displacement sensor, e.g. a displacement potentiometer.

According to a simple form of construction of the invention, the device for detecting the inoperative position of the accelerator pedal may be e.g. a switch, which in the inoperative position of the accelerator pedal is actuated by the latter and supplies the braking-force generator with a signal, in response to which the braking-force generator generates the predetermined braking force. The accelerator pedal is movable from its inoperative position into a neutral position, from which a further movement of the accelerator pedal counter to the spring bias, i.e. in actuating direction, leads to an increase of the drive torque and/or drive power of the motor vehicle engine.

Thus, according to the invention the acceleration function conventionally associated with the accelerator pedal is supplemented by an active braking function, wherein said two functions are separated from one another by the neutral position of the accelerator pedal. For specific applications it may however also be advantageous additionally to allow the said braking function to operate in actuating direction of the accelerator pedal slightly beyond the neutral position, e.g. for reliably preventing the vehicle from rolling backwards on a hill.

The apparatus according to the invention leads to considerably simplified vehicle control. For example, in stop-and-go traffic, instead of constantly having to transfer the right foot back and forth between accelerator pedal and brake pedal, the accelerator pedal now merely has to be eased back into the inoperative position. During downhill travel, when the engine braking action is frequently insufficient to achieve adequate deceleration of the vehicle, by simply easing back the accelerator pedal the brake system may be actuated with the predetermined braking force. Equally, for stopping on ascending gradients, according to the invention an easing of the accelerator pedal back into its inoperative position will in most cases be sufficient to prevent the vehicle from rolling backwards. A subsequent starting operation is also made more comfortable because, to release the brake and increase the engine drive torque, the accelerator pedal may be moved from the inoperative position quickly into the neutral position and beyond, without the usual practice of first having to transfer the right foot (from the brake pedal to the accelerator pedal), with the result that there is now virtually no opportunity for the vehicle to roll back. The apparatus according to the invention offers advantages also during emergency braking operations because the braking operation is already initiated by easing back the accelerator pedal and so is initiated more quickly than was previously usual. According to the invention the predetermined braking force is normally lower, in most cases even markedly lower, than the maximum possible braking force.

As already mentioned, the apparatus according to the invention is preferably designed in such a way that the braking-force generator in the neutral position of the accelerator makes no braking force or, at any rate, substantially no more braking force available.

In preferred embodiments of the apparatus according to the invention, the dimension of the predetermined braking force is varied in dependence upon specific parameters. For example, in one embodiment the predetermined braking force is increased as the road speed rises, and vice versa. In said manner, by means of the accelerator pedal an effective braking function is maintained also at higher road speeds.

In another embodiment, the magnitude of the predetermined braking force is varied in dependence upon the way in which the motor vehicle is moved. For example, for a sporty driving style the predetermined braking force is set higher than for a steady and economical driving style.

In yet another embodiment, the predetermined braking force is varied in dependence upon the speed at which the accelerator pedal is eased back. For a rapid release of the accelerator pedal the predetermined braking force is in said case set higher than for an only gradual easing back of the accelerator pedal. In said manner, the stopping distance of the vehicle in emergency braking situations may be markedly shortened.

In a further embodiment, the predetermined braking force is varied in dependence upon the inclination of the road on which the vehicle is situated. By inclination, here, is meant a descending or ascending gradient. The greater the ascending or descending gradient, the higher the predetermined braking force is set.

The described dependencies of the predetermined braking force may advantageously also be combined.

According to the invention, the braking-force generator may be a driver-independently actuable vacuum brake booster, a hydraulically or pneumatically actuable brake booster, a pressure accumulator or a pump, in particular the pump of a brake slip control system, which nowadays is already standard equipment in many motor vehicles. The braking-force generator may however also be an electrically operated actuator of a vehicle brake itself.

To help the driver of a motor vehicle to become accustomed to the apparatus according to the invention, the latter is preferably designed in such a way that the dimension of the spring bias of the accelerator pedal counter to actuating direction increases when, from the inoperative position of the accelerator pedal, the neutral position is reached. In said manner the driver receives clear feedback about the attainment of the neutral position because, from the neutral position on, the resistance which the driver has to overcome for further actuation of the accelerator pedal increases.

The previously described behaviour of the apparatus according to the invention may be achieved, for example, by a displacement potentiometer, which cooperates with the accelerator pedal and comprises a fettered spring acting in actuating direction of the accelerator pedal. The fettering is in said case such that the spring force acting in actuating direction of the accelerator pedal is effective only up to attainment of the neutral position of the accelerator pedal.

When besides the accelerator pedal a brake pedal is also provided, all of the embodiments of the apparatus according to the invention are preferably extended by a further device which, upon an actuation of the brake pedal, ensures that the braking-force generator generates braking force in accordance with said actuation. This means that the braking function of the accelerator pedal is deactivated when the driver actuates the brake pedal. It is thereby ensured that the driver, when he uses the brake pedal, may as usual proportion the braking force over the entire braking-force range.

By means of the previously described device or an additional device the apparatus according to the invention may also be developed in such a way that the braking function of the accelerator pedal is cut off when, for example, a vehicle dynamics control system of the vehicle comes into action. Although the device or devices in their simplest form of construction may be realized by a switch or a displacement potentiometer, in preferred embodiments a preferably electronic control unit is provided for realizing the more complex modes of behaviour. Said control unit may also communicate with sensors of other vehicle systems, e.g. with the sensors of a vehicle dynamics control system, and the signals of said sensors may be used to vary the predetermined braking force and to modify the function used to build up and/or reduce said braking force. The control unit may be a suitably modified, existing control unit of the brake system.

The initially stated object is achieved according to the invention also by a method of controlling the road speed of a motor vehicle, which comprises a brake system and an accelerator pedal, which is biased counter to its actuating direction into an inoperative position and through the actuation of which the instantaneous drive power of the motor vehicle drive may be varied, having the steps:

injecting a predetermined braking force into the brake system when the accelerator pedal is situated in its inoperative position, automatically controlled reducing of the predetermined braking force injected into the brake system as soon as the accelerator pedal is moved from its inoperative position towards a neutral position, and automatically controlled building-up of the previously described braking force as soon as the accelerator pedal reattains its inoperative position, and increasing the instantaneous drive power of the motor vehicle drive by moving the accelerator pedal beyond the neutral position.

According to an alternative, the initially stated object is achieved according to the invention also by a method of controlling the road speed of a motor vehicle, which comprises a brake system and an accelerator pedal, which is biased counter to its actuating direction into an inoperative position and through the actuation of which the instantaneous drive power of the motor vehicle drive may be varied, having the steps:

injecting a predetermined braking force into the brake system when the accelerator pedal is situated in its inoperative position, moving the accelerator pedal from the inoperative position into a neutral position and reducing the predetermined braking force injected into the brake system in accordance with the movement of the accelerator pedal, such that in the neutral position no braking force or substantially no more braking force is injected into the brake system, moving the accelerator pedal from the neutral position into the inoperative position and increasing the braking force injected into the brake system in accordance with the movement of the accelerator pedal up to the predetermined braking force, and increasing the instantaneous drive power of the motor vehicle drive by moving the accelerator pedal beyond the neutral position.

As already described in connection with the apparatus according to the invention, in the method according to the invention also the predetermined braking force is varied preferably in dependence upon the road speed and/or driving style and/or road inclination and/or speed of easing off the accelerator pedal and/or further parameters.

DETAILED DESCRIPTION OF THE INVENTION

Figure 1:
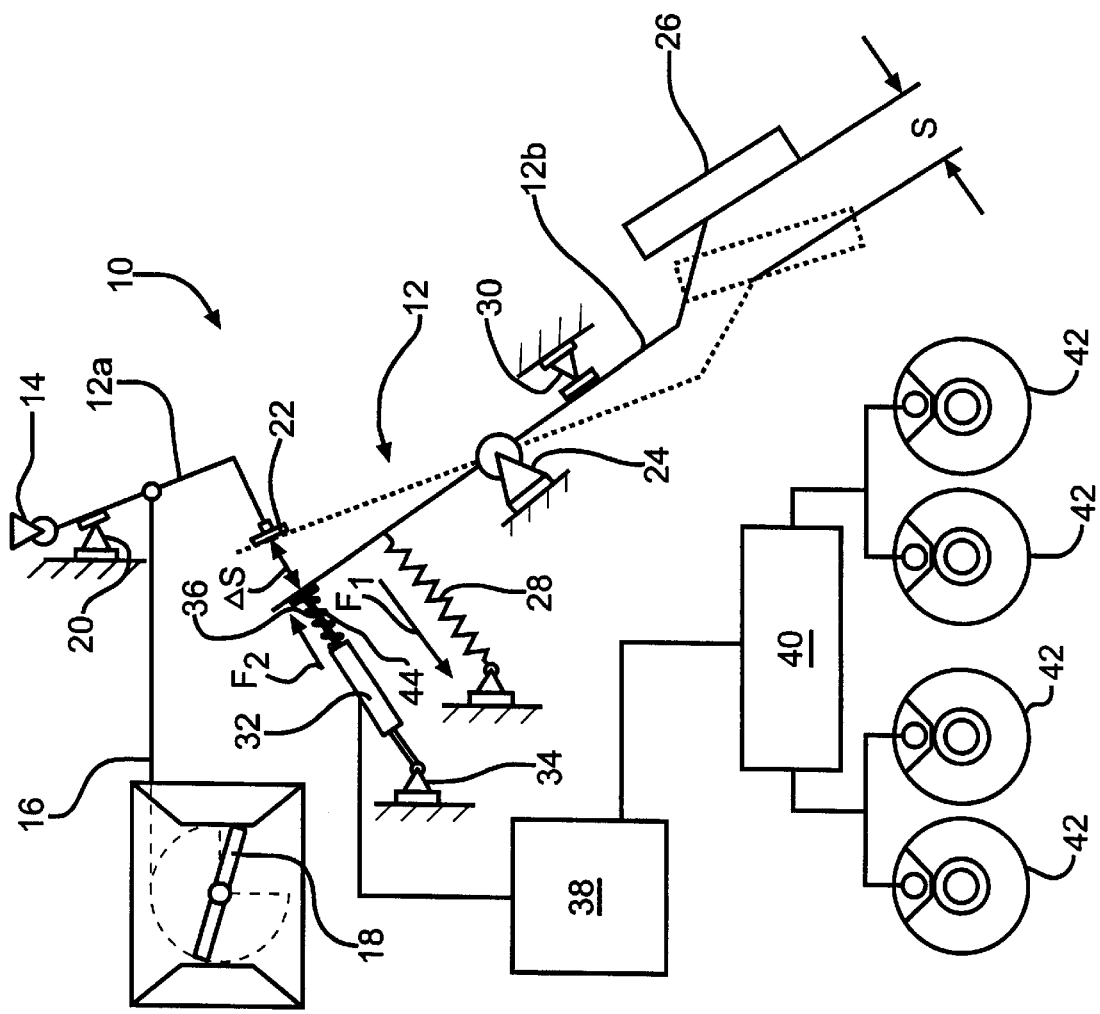
FIG. 1 a diagrammatic view of a first embodiment of an apparatus according to the invention for controlling the road speed of a motor vehicle, FIG. 2 a modified, second embodiment, and FIG. 3 a third embodiment similar to the embodiment according to FIG. 2.

FIG. 1 is a diagrammatic view of a first embodiment of an apparatus 10 for controlling the road speed of a motor vehicle. The apparatus 10 comprises an accelerator pedal 12 formed by two parts 12a, 12b, the first part 12a of which is pivotally fastened to a stationary hinge 14 and connected to a Bowden cable 16 for actuating a throttle valve 18 of an i.c. engine, which is not further illustrated. In the non-actuated position, the part 12a of the accelerator 12 rests against a stop 20 defining a neutral position, which is described in greater detail later. At its free end the part 12a is provided with a driving element 22, which is illustrated here in the form of a plate and is used to cooperate with the second part 12b of the accelerator pedal 12.

The second part 12b of the accelerator pedal 12 is fastened, normally in the foot well of the motor vehicle, in a rotatable manner to a hinge 24 and, as is customary, has a tread 26 at its end facing the driver. A spring 28 biases the part 12b of the accelerator pedal 12 into an inoperative position, which is indicated in FIG. 1 by solid lines and defined by a stop 30.

Fastened as a displacement sensor to the end of the part 12b cooperating with the free end of the first part 12a is a displacement potentiometer 32, the other end of which is fastened at 34 to a part of the vehicle body. The displacement potentiometer 32 is provided with a fettered spring 36, which exerts a force acting counter to the spring 28 upon the part 12b of the accelerator pedal 12. The fettering of the spring 36 ensures that the spring 36 may exert its force only over a distance $_AS$ upon the part 12b. Said distance $_AS$ corresponds to the distance S, which the part 12b of the accelerator pedal 12 has to travel and/or by which the accelerator pedal 12 has to be depressed in order to come into contact with the part 12a, or more precisely with the driving element 22.

The displacement potentiometer 32 is moreover electrically connected to an electronic control unit 38, which in turn is electrically connected to a braking-force generator 40.

The braking-force generator 40, which may be e.g. an electromagnetically actuable vacuum brake booster or alternatively the pressure generating pump of a brake slip control system, is connected in a conventional manner to, in the present case, four wheel brakes 42, to which the brake pressure made available by the braking-force generator 40 is supplied.

The first embodiment operates as follows. In the inoperative position of the accelerator pedal 12 illustrated by solid lines in FIG. 1, the displacement potentiometer 32 transmits a signal corresponding to said inoperative position to the control unit 38, which then instructs the braking-force generator 40 to generate a predetermined brake pressure and supply the latter to the wheel brakes 42. When the accelerator pedal 12 is actuated by pressing on the tread 26, at first only the part 12b of the accelerator pedal 12 rotates counter to the action of the spring 28 about the hinge 24, wherein the end of the part 12b cooperating with the displacement potentiometer 32 approaches the driving element 22 provided on the part 12a. A feeler 44 of the displacement potentiometer 32 detects said movement of the part 12b and causes a correspondingly changing signal of the displacement potentiometer 32, which signal is in turn supplied to the control unit 38, which then instructs the braking-force generator 40 to effect a corresponding reduction of the generated brake pressure supplied to the wheel brakes 42.

When the part 12b occupies the position indicated by dotted lines in FIG. 1, the neutral position of the accelerator pedal 12 has been reached, i.e. the total distance $_AS$ has been travelled and the end of the part 12b cooperating with the displacement potentiometer 32 is resting against the driving element 22 of the part 12a. In said neutral position the signal of the displacement potentiometer 32 is such that the control unit 38 instructs the braking-force generator 40 not to supply any more brake pressure to the wheel brakes 42. In the course of travel of the distance $_AS$ the brake pressure supplied to the wheel brakes is accordingly proportional to the diminishing distance $_AS$.

Upon a further actuation of the part 12b of the accelerator pedal 12 counter to the force of the spring 28, the part 12a then rotates about the hinge 14, with the result that the Bowden cable 16 opens the throttle valve 18 to an increasing extent and hence increases the engine power.

When the actuation of the accelerator pedal 12 is reversed, the previously described operations run off in reverse order, i.e. the throttle valve 18 is closed again and from attainment of the neutral position of the accelerator pedal 12 onwards a brake pressure, which increases steadily up to the inoperative position of the accelerator pedal 12, is supplied to the wheel brakes 42.

Starting from the inoperative position of the accelerator pedal 12 the attainment of the neutral position is easily perceptible to the driver because, from the neutral position on, the spring 36 fettered in the manner described above leads to a markedly increased actuating resistance of the accelerator pedal 12 since, for further actuation, the full force of the spring 28 and also of a non-illustrated spring, which biases the throttle valve 18 into its closed position, then has to be overcome.

Figure 2:
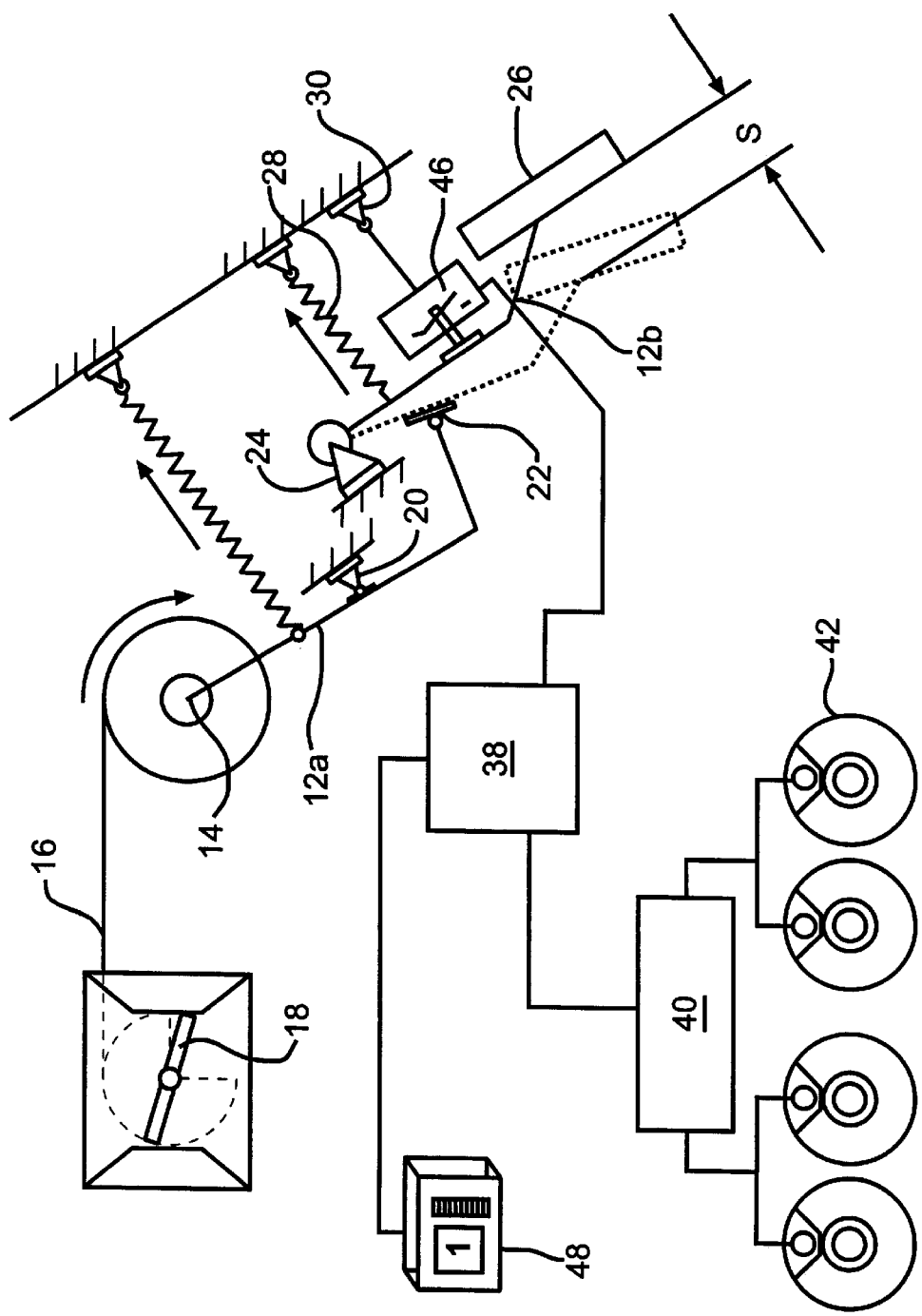

The second embodiment illustrated in FIG. 2 differs from the first embodiment in that the two parts 12a and 12b of the accelerator pedal 12 as well as their hinges 14 and 24 are arranged slightly differently and in particular in that a switch 46 is used instead of the displacement potentiometer 32. Said switch 46 merely senses the inoperative position of the accelerator pedal 12, i.e. the position of the part 12b indicated by solid lines in FIG. 2. In the said inoperative position the switch 46 supplies an "ON" signal to the control unit 38, whereupon the latter instructs the braking-force generator 40 to supply the specific, predetermined brake pressure to the wheel brakes 42.

Upon an actuation of the accelerator pedal 12 according to the second embodiment the switch 46 supplies an "OFF" signal to the control unit 38 as soon as the part 12b of the accelerator pedal 12 has left its inoperative position. The braking-force generator 40 is then instructed by the control unit 38 to reduce the built-up brake pressure in accordance with a predetermined function. Said function may be selected in such a way that the built-up brake pressure is fully reduced either before attainment of the neutral position indicated by dotted lines, upon attainment of said neutral position or not until shortly after attainment of the neutral position. The further actuation is effected analogously to the first embodiment.

Upon an easing-off of the accelerator pedal 12, the switch 46 generates an "ON" signal as soon as the part 12b has reattained its inoperative position. In response to the "ON" signal, the control unit 38 instructs the braking-force generator 40 to build up a brake pressure in accordance with a predetermined function, e.g. a ramp function, and supply said brake pressure to the wheel brakes 42.

The second embodiment also comprises an adjusting device 48 for adjusting the nature of the brake pressure build-up and brake pressure reduction and the maximum brake pressure, which is supplied to the wheel brakes 42 in the inoperative position of the accelerator pedal 12. The adjusting device 48 may also be part of the electronic control unit 38 and may moreover vary the function, which is used to build up and reduce the brake pressure, automatically in dependence upon specific parameters, e.g. in dependence upon the road speed, driving style, road inclination (descending or ascending gradient) etc.

Figure 3:
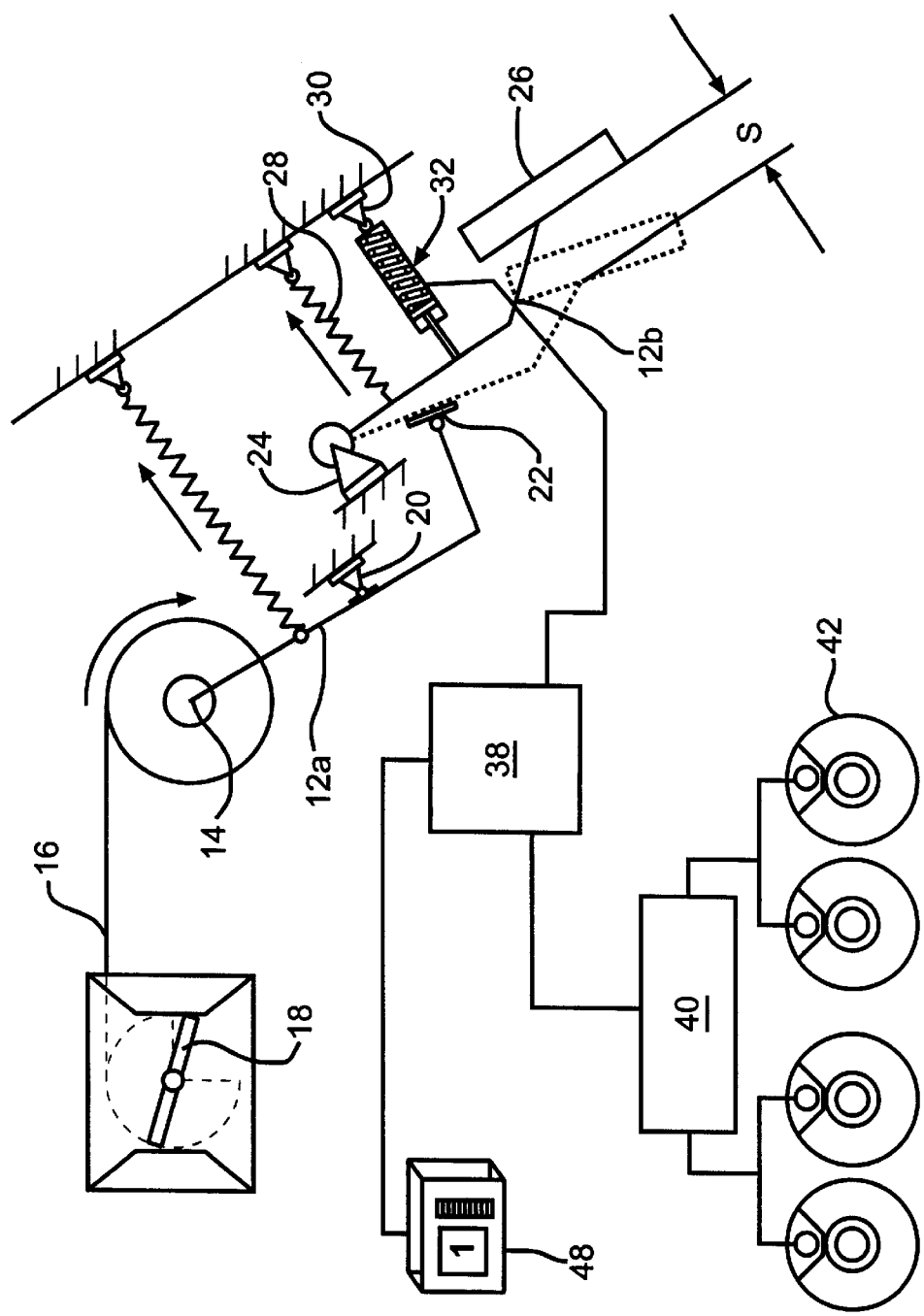

The third embodiment illustrated in FIG. 3 differs from the second embodiment only in that once more a displacement potentiometer 32 is used instead of the switch 46.

Each of the embodiments of the apparatus may further include a brake pedal 50 (FIG. 1). When a brake pedal is provided, each embodiment is preferably extended by a further device which, upon actuation of the brake pedal, ensures that the braking-force generator generates braking force in accordance with the actuation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Apparatus for controlling the road speed of a motor vehicle, comprising
    an accelerator pedal, which is spring-biased counter to its actuating direction into an inoperative position and is movable from the inoperative position into a neutral position, from which a further movement of the accelerator pedal counter to the spring bias leads to an increase of the drive torque of the motor vehicle drive, and
    a device for detecting the inoperative position of the accelerator pedal, which is connected to a braking-force generator and which in the inoperative position of the accelerator pedal causes the braking-force generator to make a predetermined braking force available,
    wherein the braking-force generator builds up the predetermined braking force in a controlled manner when the accelerator pedal attains its inoperative position, and/or reduces the built-up braking force in a controlled manner when the accelerator pedal leaves its inoperative position, and wherein the magnitude of the predetermined braking force is dependent upon the road speed.

2. Apparatus for controlling the road speed of a motor vehicle, comprising
    an accelerator pedal, which is spring-biased counter to its actuating direction into an inoperative position and is movable from the inoperative position into a neutral position, from which a further movement of the accelerator pedal counter to the spring bias leads to an increase of the drive torque of the motor vehicle drive, and
    a device for detecting the inoperative position of the accelerator pedal, which is connected to a braking-force generator and which in the inoperative position of the accelerator pedal causes the braking-force generator to make a predetermined braking force available,
    wherein the device for detecting the inoperative position of the accelerator pedal, upon a movement of the accelerator pedal from the inoperative position into the neutral position, causes the braking-force generator to reduce the predetermined braking force in accordance with the accelerator pedal movement and vice versa, and wherein the magnitude of the predetermined braking force is dependent upon the road speed.

3. Apparatus according to claim 1,
    wherein the braking-force generator in the neutral position of the accelerator pedal does not make any more braking force available.

4. Apparatus according to claim 1,
    wherein the magnitude of the predetermined braking force is dependent upon the style in which the motor vehicle is being driven.

5. Apparatus according to claim 1,
    wherein the magnitude of the predetermined braking force is dependent upon the speed at which the accelerator pedal is moved from an actuated position back into the neutral position.

6. Apparatus according to claim 1,
    wherein the braking-force generator is a driver-independently actuable vacuum brake booster, a hydraulically or pneumatically actuable brake booster, a pressure accumulator, an electrically operated actuator of a vehicle brake, or a pump.

7. Apparatus according to claim 1, wherein the dimension of the spring bias of the accelerator pedal counter to actuating direction increases when, starting from the inoperative position of the accelerator pedal, the neutral position is attained.

8. Apparatus according to claim 1, wherein the device for detecting the inoperative position of the accelerator pedal is a switch.

9. Apparatus according to claim 1,
    wherein the device for detecting the inoperative position of the accelerator pedal is a displacement potentiometer, which cooperates with the accelerator pedal.

10. Apparatus according to claim 1,
    wherein besides the accelerator pedal there are provided a brake pedal, which cooperates with the braking-force generator, as well as a device which, upon actuation of the brake pedal, ensures that the braking-force generator generates braking force in accordance with said actuation.

11. Method of controlling the road speed of a motor vehicle, which comprises a brake system and an accelerator pedal, which is biased counter to its actuating direction into an inoperative position and through the actuation of which the instantaneous drive power of the motor vehicle drive may be varied, having the steps:
    injecting a predetermined braking force into the brake system when the accelerator pedal is situated in its inoperative position such that the magnitude of the predetermined braking force is dependent upon the road speed,
    automatically controlled reducing of the predetermined braking force injected into the brake system as soon as the accelerator pedal is moved from its inoperative position towards a neutral position, and automatically controlled building-up of the previously described braking force as soon as the accelerator pedal retains its inoperative position, and
    increasing the instantaneous drive power of the motor vehicle drive by moving the accelerator pedal beyond the neutral position.

12. Method of controlling the road speed of a motor vehicle, which comprises a brake system and an accelerator pedal, which is biased counter to its actuating direction into an inoperative position and through the actuation of which the instantaneous drive power of the motor vehicle drive may be varied, having the steps;

injecting a predetermined braking force into the brake system when the accelerator pedal is situated in its inoperative position such that the magnitude of the predetermined braking force is dependent upon the road speed, moving the accelerator pedal from the inoperative position into a neutral position and reducing the predetermined braking force injected into the brake system in accordance with the movement of the accelerator pedal, such that in the neutral position no braking force or substantially no more braking force is injected into the brake system, moving the accelerator pedal from the neutral position into the inoperative position and increasing the braking force injected into the brake system in accordance with the movement of the accelerator pedal up to the predetermined braking force, and increasing the instantaneous drive power of the motor vehicle drive by moving the accelerator pedal beyond the neutral position.

13. Method according to claim 11, wherein the predetermined braking force is varied in dependence upon the driving style and/or the road inclination and/or the speed of easing off the accelerator pedal.

14. Apparatus according to claim 8, wherein the switch is actuable by the accelerator pedal.

15. Apparatus according to claim 6, wherein said pump is the pump of a brake slip control system.

* * * * *